T. W. JOCKISCH.
PEANUT STRIPPING MACHINE.
APPLICATION FILED DEC. 2, 1916.
1,250,466.
Patented Dec. 18, 1917.
3 SHEETS—SHEET 3.
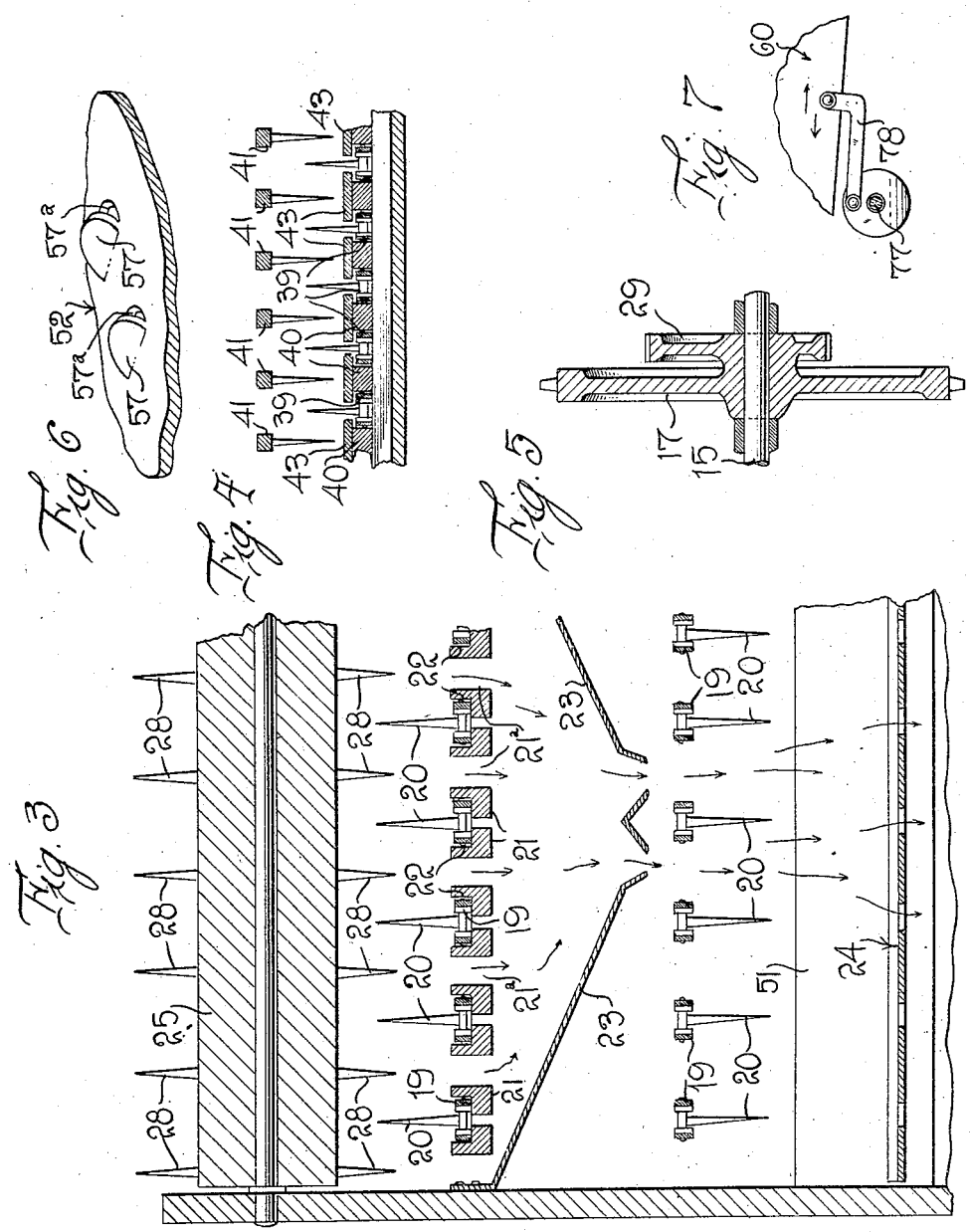
Inventor
T. W. JOCKISCH
By Watson E. Coleman
Attorney

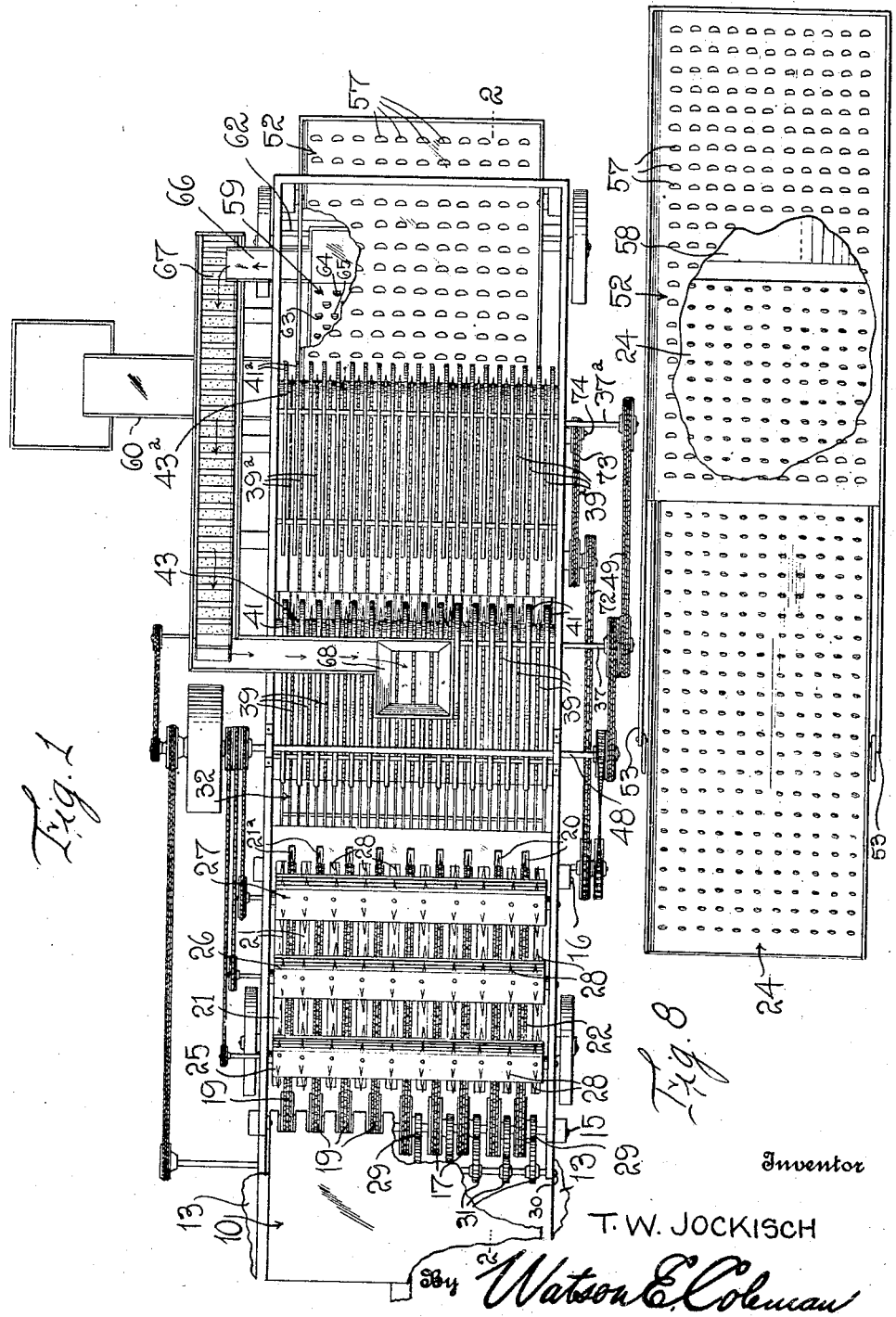

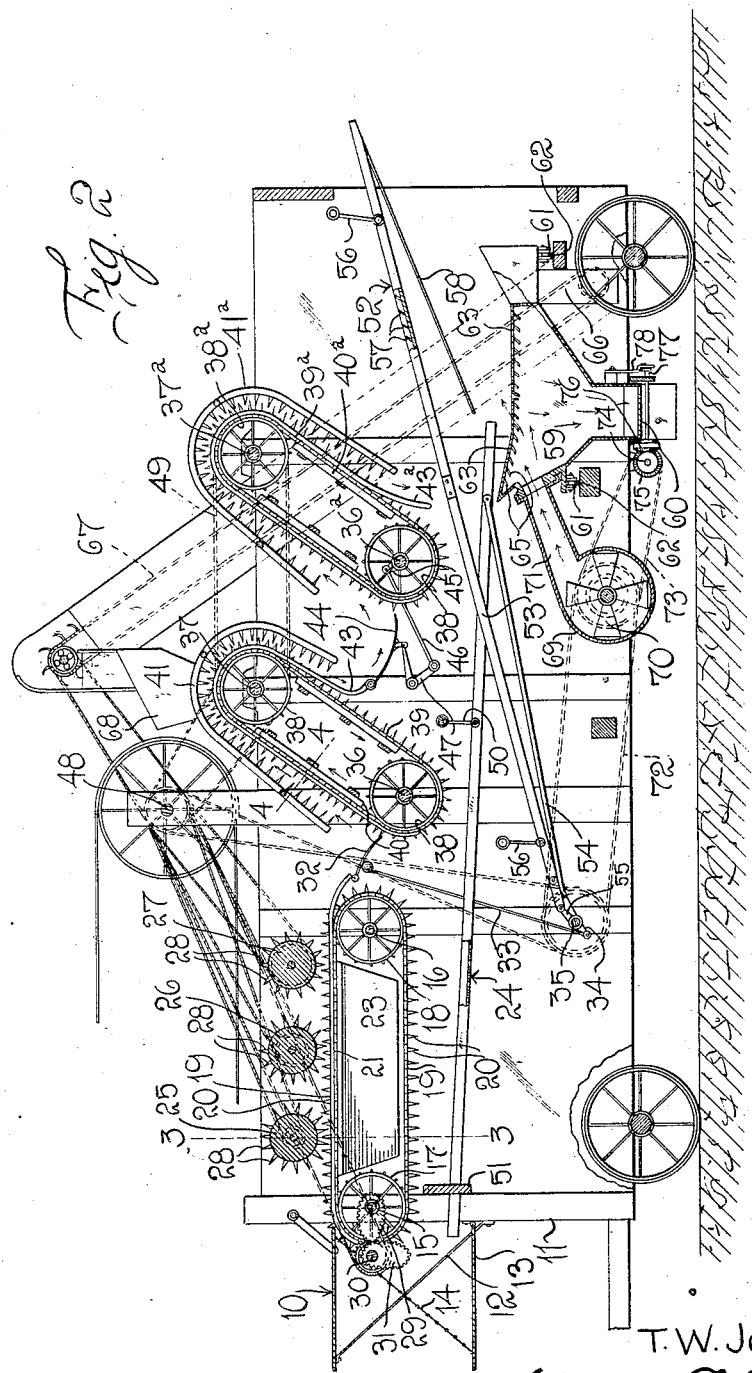

UNITED STATES PATENT OFFICE.

THEODORE W. JOCKISCH, OF GREENSBORO, ALABAMA.

PEANUT-STRIPPING MACHINE.

1,250,466.   Specification of Letters Patent.   Patented Dec. 18, 1917.

Application filed December 2, 1916. Serial No. 134,724.

*To all whom it may concern:*

Be it known that I, THEODORE W. JOCKISCH, a citizen of the United States, residing at Greensboro, in the county of Hale and State of Alabama, have invented certain new and useful Improvements in Peanut-Stripping Machines, of which the following is a specification, reference being had to the accompanying drawings.

This invention relates to mechanism for stripping peanuts from the vine and particularly to improvements in peanut picking mechanism which forms the subject of Patent #1,196,458 granted to me on August 29, 1916.

The general object of my invention is to provide a peanut stripping mechanism in which the vines are passed through a plurality of stripping devices, each time changing the direction of movement of the vines, these devices being so constructed as to thoroughly tear apart the vines and agitate them so as to get rid of the dirt and sand adhering thereto and to the nuts and separate the nuts from the vines so that at the last the vines are discharged with all of the peanuts detached therefrom.

Still another object of the invention is to provide for carrying back those peanuts which have not been fully stripped or to which portions of the vine or to which the stems adhere so that these peanuts may be again subjected to the action of one or more of the stripping devices.

Still another object of this invention is to provide means whereby the peanuts may be subjected to a relatively gentle detaching action initially and successively subjected to more energetic successive actions to thereby prevent the crushing of relatively dry nuts.

A further object is to provide means whereby the sprocket chains of the gang of chains upon which the vines are first deposited may move at varying rates of speed to more thoroughly separate the vines to thus prevent the vines from bunching or clogging the machinery, and secure a better separation of the nuts from the vines.

Other objects will appear in the course of the following description.

My invention is illustrated in the accompanying drawings, wherein—

Figure 1 is a top plan view of a peanut stripping machine constructed in accordance with my invention;

Fig. 2 is a longitudinal sectional view thereof, and showing in dotted lines the means for driving the various rotatable elements;

Fig. 3 is an enlarged vertical sectional view on the line 3—3 of Fig. 2;

Fig. 4 is a sectional view on the line 4—4 of Fig. 2;

Fig. 5 is a sectional view of one of the sprocket wheels 17 and its connected gear wheel 29;

Fig. 6 is a fragmentary perspective view of the screen 52;

Fig. 7 is a side elevation of the means for oscillating the hopper 59;

Fig. 8 is a top plan view of the screens 24 and 52.

Referring to these figures, and particularly to Fig. 2, it will be seen that my invention embodies a supporting frame of any suitable construction, preferably mounted upon wheels and having draft attachments applied thereto so that it may be readily moved from place to place if desired. The peanut vines are fed into the machine from the table 10. This table is hingedly mounted upon the vertical posts 11 which form the forward end of the frame so that it may be turned up over the top of the frame when the machine is being transported from place to place. This table 10 is shown as supported upon braces 12 of any suitable construction which are detachably connected to the posts 11 and on each side of the table there is disposed the platform 13 upon which the operator stands. This platform is intended to fold downward or inward between the posts 11 and is detachably supported by means of chains or other flexible connections 14.

Mounted upon the frame in any suitable manner are the shafts 15 and 16 carrying sprocket wheels 17 and 18 respectively. The sprocket wheels 17 revolve upon the shaft 15 and independently of each other. I have illustrated nine of these sprocket wheels 17 but it is to be understood that a greater or less number may be provided. There are also of course nine of the sprocket wheels 18 and these sprocket wheels must also be mounted independently upon the shaft 16. Extending over these wheels 17 and 18 are the sprocket chains 19 of any suitable construction and provided with the outwardly projecting spikes or prongs 20. The upper flight of the sprocket chains 19 pass over a table which is composed of the longitudinally extending members 21, each of these members being formed with the longitudinally extending slot 21ª, as illustrated most clearly in Fig. 3, and the members being spaced from each other to provide for the passage of the sprocket chains, the confronting edges of the members 21 being rabbeted or otherwise formed to provide guideways 22 over which the sprocket chains pass. These longitudinally extending members 21 may be supported in any suitable manner and connected to each other at the ends as may be found most convenient. These members may be formed in any suitable and convenient manner and preferably attached to the gang formed of these members, that is to the outermost members 21, are the downwardly and inwardly converging walls 23 which extend downward to a point just above the lower flight of the sprocket chain 19 and, as illustrated in Fig. 3, the hopper formed by these walls 23 discharges between two adjacent sprocket chains 19 onto a screen 24 whose purpose will be later stated.

Disposed above the upper flight of the sprocket chain 19 are a plurality of vine retarding rolls shown as three in number and designated respectively 25, 26 and 27. These rolls are provided with radiating spikes 28, these spikes being arranged in staggered relation to the sprocket chains 19 carrying the spikes 20. Preferably these rolls are all of the same diameter but rotate at different speeds. Thus I have illustrated the roll 25 as being rotated relatively rapidly, the roll 26 as being driven at less speed, and the roll 27 as being driven at the slowest speed. The roll 25 runs at the rate of about twelve revolutions a minute or nearly the same rate as the screen; the roll 26 at about eight revolutions, and the roll 27 at about four revolutions a minute. It will thus be seen that there will be a small retardation of the vines when they enter the machine and that because of the difference in speed between the vine carrier and the roller 25 the vines will be torn apart or rather the bundles will be torn apart and distributed. The cylinder 26 rotates slower than the cylinder 25 and, as a consequence, there will be a greater difference in speed between the cylinder and the vine carrier so that there will be a greater tendency to tear apart the vine bundles. The roll 27 rotates at a still slower speed than the vine carrier so that the vines are further retarded in their movement. The action of these rolls 25, 26 and 27 is not only to tear the vine bundles apart and distribute the vines evenly over the carrier but also these rolls act to detach a large number of dry peanuts from the vines so that the vines are stripped to some degree before they pass beneath the last roll 27. The dirt, sand and other relatively heavy foreign matter which is disengaged from the nuts and from the vines by the distributing rolls will drop down through the chains 19, together with dry peanuts which may have become detached from the vines, and drop upon the screen 24 which is perforated or reticulated so as to permit the sand and dirt to drop down below the screen while the nuts pass on to the final screening device, as will be later described.

Preferably in order to secure an even more thorough distribution of the vines than is otherwise possible, I so drive the chains 19 or the sprocket wheels 17 and 18 that the chains move alternately rapidly and slowly, that is the speed of any one chain is alternately rapid and alternately relatively slow, and for this purpose I mount upon the shaft 15 a plurality of elliptical gear wheels 29. There is one of these gear wheels 29 for each of the sprocket wheels 17 and operatively connected thereto and I mount upon a shaft 30 extending parallel to the shaft 15 a plurality of elliptical gear wheels 31 coacting with the elliptical gear wheels 29 in a well-known manner so that the speed of any one gear wheel 17 is alternately rapid and slow. The gear wheels 31 and 29 which coact with any one sprocket wheel 17 are arranged in quartering relation to the gear wheels 31 and 29 on the next adjacent sprocket wheels so that while one sprocket chain is moving slowly for instance, the next adjacent sprocket chains are moving fast. Thus while the movement of all the sprocket chains 19 is forward, yet the sprocket chains relatively move forward and rearward and this movement, together with the action of the rolls 25, 26 and 27 tends to more thoroughly tear apart the bundles or vines, more thoroughly distribute them, and acts to keep the vines from clogging. This motion given to the vines is also of importance in that the peanuts are more thoroughly stripped from the vines during this portion of the operation than they would otherwise be.

The table formed by the members 21 extends outward beyond the periphery of the sprocket wheels 18 so as to strip the vines from these sprocket wheels and prevent the vines passing around these sprocket wheels and the vines are delivered upon an oscillating slotted chute designated 32. This chute is oscillated by a rod 33 which extends downward from near the axis of the chute to a crank 34 mounted upon a shaft 35. This chute 32 delivers the vines upon a second stripping device now to be described.

Mounted upon the frame in any suitable manner are the shafts 36 and 37, these shafts being disposed in a plane extending upward and rearward. Mounted upon these shafts 36 and 37 are the sprocket wheels 38 over which pass a series of sprocket chains 39 having outwardly projecting spikes or spurs. The flights of the sprocket chains 39 are held in parallel relation by longitudinally extending bars 40 and disposed in an approximately parallel relation to the forward and rear flights and the upper sprocket wheel 38 are a series of bars 41 spaced from each other and carrying spikes, these spikes being disposed in staggered relation to the spikes or spurs of the sprocket chains 39. These bars 41 at their entrance and exit ends are spaced a greater distance from the flights of the sprocket chains 39 than at the middle portions of the bars 41, as illustrated clearly in Fig. 2. For the purpose of stripping the vines from the spikes and the sprocket chains 39, I provide the bars 43 which extend downward from the surface of the sprocket wheel 38 and then outward beyond the plane of movement of the ends of the spikes on this sprocket chain 39 and deliver the vines onto an oscillating chute 44.

From the chute 44 the vines are then delivered to a second nut detaching device which is constructed in exactly the same manner as the first device and hence the same reference numerals are given to it. There is an upper and a lower shaft designated respectively 36ª and 37ª and carrying upon them the sprocket wheels 38ª over which pass a sprocket chain 39ª having outwardly projecting pins or spurs, the upper portion of the flight of these sprocket chains being approximately parallel to a series of bars 41ª carrying inwardly projecting pins or spurs, the exit and entrance ends of these bars being divergently related to the forward and rear flights of the sprocket chains. The only difference between the second and the first of these outwardly extending peanut detaching devices is the fact that the bars 41ª extend somewhat farther down on the rear side than they do in the first of these devices. Here also a series of stripping bars 43ª is used to detach the vines from the spikes and prevent the vines being carried around and around with the flight of the sprocket chains. The shaft 36 of this third stripping device is provided with a crank 45 which is connected by means of a crank 46 to a bell crank lever 47, in turn operatively connected to the oscillating chute 44 so as to oscillate it therewith.

While I do not wish to be limited to any particular means of connecting the rolls 25, 26 and 27 and the shaft 30 to a driving shaft or shafts, I have illustrated a driving shaft 48 which may be operated in any suitable manner and with any desired power and have illustrated belts on this shaft engaging the several rolls 25, 26 and 27 and the shaft 30 and have also illustrated this shaft 48 as being belted to the uppermost shaft 37, this shaft in turn carrying a belt wheel whereby power is communicated through a belt 49 to the shaft 37ª. The crank shaft 34 is also shown as driven from the shaft 48 though, as above stated, I do not wish to be limited to this as it is obvious that other means for connecting the driving power to the several shafts may be used.

The screen 24 is a reciprocating or shaking screen. It is preferably made of perforated sheet metal, the perforations being small enough to prevent the peanuts from passing downward but permitting the passage of sand and dirt. This screen 24 is shown as mounted upon links 50 and at its rear end slidably mounted upon the frame as by cleats 51. The peanuts that are discharged through the lower flight of the chains 19 are received upon this screen and so also are the peanuts which may be discharged or disengaged from the vines while the vines are passing through the second of the nut detaching devices. The nuts which are discharged from the third of the nut detaching devices and also the vines which are so discharged fall upon a screen 52 which is also a reciprocating screen. The lower end of this screen 52 is provided with laterally disposed legs or links 53 between which the screen 24 passes, as illustrated clearly in Fig. 8. The screen 24 is oscillated by means of a link 54 connected to a crank 55 on the crank shaft 34, while the screen 52 is oscillated by having the lower ends of its legs 53 operatively connected to said crank 55, the screen 52 being mounted upon links 56. The screen 52 is of sheet iron formed with a plurality of semi-circular openings each of the openings being provided with an upwardly projecting tongue 57, as illustrated in Fig. 6. These tongues extend upward and rearward so that as the screen is oscillated the tongues will catch the vines and drag the vines upward so that the vines are gradually discharged from the upper end of the screen 52 while the nuts fall through the perforations 57ª. These upwardly extending tongues prevent the too rapid descent of the nuts but permit them to fall through the perforations 57ª but any nuts which do roll down the screen 52 find lodgment upon the lower end of the screen 24. Beneath this screen 52 is a chute 58 of sheet metal which discharges the nuts which may fall through the screen 52 onto the lower end of the screen 54. Disposed below the lower end of the screen 24 is a hopper-like body 59 having downwardly converging side walls discharging into a trough 60. The hopper-like body 59 is mounted so that it may reciprocate laterally, as for instance by being provided with wheels 61 engaging with the tracks 62, this hopper-like body being reciprocated in any suitable manner. At its mouth the hopper 59 is provided with sectional screens 63, these screens having semi-circular openings 64 with tongues 65 extending downward and forward. These screens discharge everything that remains upon their upper surfaces into a trough 66. This trough is downwardly and laterally inclined and discharges into an elevator 67 of any suitable construction which extends upward and rearward and discharges into a hopper 68 which in turn discharges between the bars 41 so that the nuts carried up by this elevator are re-submitted to the action of the stripping devices. Disposed forward of the hopper 59 is a fan casing 69 having therein a fan 70, shown as a rotatable fan, and this fan casing 69 is connected by an elongated nozzle 71 to the forward wall of the hopper 59 so that the blast of air is discharged from the fan casing into the hopper 59 and against the under faces of the screens 63. This nozzle 71 may be of flexible material so as to permit the lateral reciprocation of the hopper 59 without affecting the fan casing. The fan is illustrated as being driven by a belt 72 from a belt wheel on shaft 35 and from a band wheel on the shaft of the fan, a belt 73 is illustrated as driving a shaft 74 having upon it a beveled gear wheel 75 engaging a beveled gear wheel 76 in turn driving a crank shaft 77 which in turn is connected by a link 78 to the depending portion of the hopper 59 or, to be exact, to the trough 60. By this means a reciprocating movement is given to the hopper 59 and to the trough 60. This agitates the material upon the screen 63 so as to shake the nuts down through the apertures in the screen and also acts to jar or shake the nuts discharged into the trough 60 so as to carry them laterally and permit them to be discharged at the side of the machine, as illustrated in Fig. 1.

While I have illustrated the details of construction which I believe to be extremely effective for the purpose intended, yet it is to be understood that many of these details may be changed without departing from the spirit of the invention as defined in the appended claims and I, therefore, do not wish to be limited to any of the details illustrated and particularly I do not wish to be limited to the means illustrated for driving the various elements of which the machine is composed. The general operation of the mechanism will be obvious from what has gone before. The vines are fed to the chains 19 where the bundles are torn apart and distributed. At this point a large number of peanuts are detached from the vines and drop upon the screens 24 and are carried downward to the screens 63 of the hopper 59. The vines pass on to the chute 32 and are then tossed upward or shaken and are engaged by the prongs or pins projecting from the sprocket chains 39. The vines are thus drawn upward and submitted to the action of the pins on the bars 41 and the pins on the sprocket chains so that the vines are still further torn apart and the nuts disengaged. The nuts disengaged at this point drop through the bars 40 and are discharged upon the screen 24 or carried over the upper sprocket wheels 38 and discharged downward onto the shaking chute 44. This chute, like the chute 32, is slotted or composed of bars so that the nuts can drop through but the vines will not drop through. The vines are then caught by the pins on the sprocket chains $39^a$ and are drawn upward beneath the bars $41^a$ and so around and are stripped from the pins on the sprocket chains $39^a$ by the stripper bars $43^a$. The vines by this time have become entirely stripped of nuts and the vines, and nuts, which are detached by this last operation, drop down upon the screen 52 and the vines are carried up by the reciprocating action of this screen while the nuts either drop through the screen or roll downward and are discharged upon the screen 24 and are then eventually discharged upon the screen 63. By this time all the dirt and foreign matter adhering to the nuts has been discharged, but oftentimes the stems of the nuts adhere thereto and it is not desirable that the nuts with these stems should be discharged from the machine until the stems have been detached and these nuts with the stems are screened from the nuts without the stems by the screen 63 and discharged into the chute 68 to be again treated. My mechanism constructed as above described does not break the shells of the peanuts but it does act effectively to strip the nuts from the vines so that the vines come out perfectly clean. It has been found in practice that a much larger percentage of nuts is saved or stripped from the vine with the mechanism above described than with the mechanism which is illustrated in my prior patent before referred to. This is due to the fact that the direction of movement of the vines is changed. Thus the vines move forward in a horizantal plane while they are passing beneath the rolls 25, 26 and 27 and then the vines move downward and the direction of their movement is changed quickly or suddenly by the action of the chains 39. This change of movement tends to more effectually detach the nuts than can possibly be accomplished where the vines move in one plane and in one direction. The vines are then again changed in their movement by the engagement of the sprocket chains $39^a$. While I have illustrated two of these upwardly and rearwardly extending stripping devices, I wish it understood that more than two may be used if necessary or less than two.

Peanuts when they are brought to be stripped from the vines are sometimes very dry, sometimes damp, but more often part of the peanuts are very dry and part are damp. The shells of the very dry peanuts are very easily crushed, while the shells of the damp peanuts are relatively tough, not so easily crushed, and not so easily detached from the vines. My mechanism makes provision for this condition. When the vines are initially passed beneath the rolls 25, 26 and 27 they are submitted to a relatively gentle action which does not crush the dry and brittle peanut shells but which at the same time detaches these dry peanuts, but this is ordinarily not sufficient to detach the peanuts whose shells are not dry but somewhat damp. This is accomplished by having the rolls 25, 26 and 27 rotate in the same direction as the sprocket chains 19 and it will be noted that while the roll 25 rotates at very nearly the same speed as the speed of movement of the sprocket chains, the rolls 26 and 27 rotate at a successively lower speed. Thus the action of the first roll is particularly gentle and the driest peanuts will be accordingly detached while the next driest peanuts will be detached by the roll 26. Furthermore, as was stated, the chains 19 have their spikes 20 disposed about four inches apart, while the spikes on the chains 39 are only about three inches apart, measuring laterally across the series of chains and the spikes on the chains 39ª are about two inches apart, measuring laterally. The same is true of the spikes on the bars 41 and 41ª, these being correspondingly nearer together. The consequence of this arrangement is that, as before stated, the vines are submitted to a relatively light or gentle tearing action when they first enter the machine whereby the dry nuts are detached without crushing and then the vines are successively submitted to a stronger action as they pass through the second series of stripping devices and the third set of stripping devices so that when the vines are finally discharged, the peanuts have been entirely stripped from the vine. This is a very important feature of my invention for the reason that in ordinary peanut stripping mechanisms there is a considerable loss due to the crushing of the nut shells, or, on the other hand, if the tearing and detaching actions are too light, the loss due to nuts adhering to the vines. While on the one hand the producer must secure the largest possible crop from the vines, yet on the other hand, the wholesale buyer insists that no peanut shells shall be broken or even cracked so that they will open upon pressure and if an order of peanuts is delivered to the buyer with only a small proportion of the shells cracked or in the "oyster mouth" condition, as it is termed in the trade, the price for the entire lot will be very greatly reduced or the order returned upon the producer's hands.

Having thus described this invention, what I claim is:—

1. In a peanut picking machine, a plurality of endless vine carriers provided with vine-engaging projections, and disposed in successive relation to successively change the direction of movement of the vines, and members disposed in proximity to the endless carriers and parallel thereto having projections coacting with the projections on the carriers to strip the peanuts from the vines.

2. In a peanut picking machine, a plurality of endless elements disposed side by side and moving in the same direction and having vine-engaging projections, said endless elements moving constantly in one direction but at unequal speeds and at all times in the same plane, and members disposed in parallel relation to the path of movement of the endless elements and having vine-engaging projections coacting with the projections on the endless elements.

3. In a peanut picking machine, a plurality of endless vine carriers provided with vine-engaging projections disposed to successively change the direction of movement of the vines, members disposed in proximity to the endless carriers and having projections coacting with the projections on the carriers, to strip the peanuts from the vines, and oscillating chutes arranged between the endless vine carriers and acting to transfer the vines from one carrier to the next carrier.

4. In a peanut picker, a plurality of endless elements disposed side by side and moving at all times in the same plane and in the same direction but at unequal speeds, each of said endless elements having vine-engaging projections.

5. In a peanut picker, a plurality of endless elements disposed side by side and moving at all times in the same plane and in the same direction but at unequal speeds, each of said endless elements having vine-engaging projections, and members disposed in parallel relation to the path of movement of the endless elements and having vine-engaging projections coacting with the projections on the endless elements.

6. In a peanut picker, a plurality of endless elements disposed side by side and moving constantly in the same direction and at all times in the same plane, and having vine-engaging projections, members disposed in parallel relation to the path of movement of said endless elements and having coacting vine-engaging projections, and means for alternately, accelerating and retarding the sped of movement of the alternate endless elements.

7. In a peanut picker, a plurality of endless elements disposed side by side and moving constantly in the same direction and at all times in the same plane, each element having vine-engaging projections, members disposed in parallel relation to the path of movement of the endless elements and having coacting vine engaging projections, and means constantly changing the speed of movement of any endless element relatively to the next adjacent endless element.

8. In a peanut picker, vine-engaging members moving in a closed path in the same direction and in the same plane and disposed side by side, having vine-engaging projections, members disposed in approximately parallel relation to the path of movement of said first named members and having coacting vine-engaging projections, and means constantly varying the speed of any one of said first-named members, relative to the speed of the next adjacent members.

9. In a peanut picker, an endless vine carrier disposed in a horizontal plane and provided with vine-engaging projections, a plurality of rollers having vine-engaging projections and mounted above said endless carrier and rotating at different speeds, an endless carrier disposed at an angle to the first named endless carrier and having vine-engaging projections, members extending over the upper portion of the endless carrier and having vine-engaging projections pointing toward the endless carrier, and means for guiding the vines from the first named endless carrier to the second named endless carrier.

10. In a peanut picker, an endless vine carrier disposed in a horizontal plane and provided with vine-engaging projections and rollers mounted above said endless carrier and rotating at different speeds, an endless carrier having downwardly divergent flights, both flights being disposed at an angle to the first named endless carrier and having vine-engaging projections, members having portions extending downward over both of said flights and having vine-engaging projections pointing toward the endless carrier, and means for guiding the vines from the first-named endless carrier to the second named endless carrier.

11. In a mechanism of the character described, a pair of sprocket wheels, an endless element passing over the sprocket wheels and having outwardly projecting pins, and means for stripping the material from said endless element, comprising bars disposed in staggered relation to the pins, the bars at one end being in contiguity to the face of the endless element and diverging outward at the discharge end, whereby to lift the material from the pins.

12. In a peanut stripping machine, a plurality of stripping devices, each of said devices comprising relatively fixed and movable elements between which peanut vines are adapted to pass, the fixed and movable elements being formed with confronting vine engaging projections, the projections on the series of devices being successively nearer to each other whereby to initially subject the vines to a relatively gentle tearing action and successively subject the vines to a more energetic tearing action.

13. In a mechanism of the character described, upper and lower wheels, an endless element passing around said upper and lower wheels, said endless element having outwardly projecting stripping pins, and a fixed element disposed approximately parallel to the endless element and extending over the upper sprocket wheel and having inwardly projecting pins, the ends of said fixed element being disposed in slightly divergent relation to the path of movement of the endless element.

In testimony whereof I hereunto affix my signature in the presence of two witnesses.

THEODORE W. JOCKISCH.

Witnesses:
FREDERIC B. WRIGHT,
M. R. WILSON.

Copies of this patent may be obtained for five cents each, by addressing the "Commissioner of Patents, Washington, D. C."